2,897,238
METHOD FOR THE SEPARATION OF CARBONYL COMPOUNDS

Otmar Töppel, Aschaffenburg (Main), Germany, assignor to Aschaffenburger Zellstoffwerke A.G., Aschaffenburg, Germany No Drawing. Application August 18, 1955
Serial No. 529,343

Claims priority, application Germany August 19, 1954

13 Claims. (Cl. 260—600)

This invention relates to a method for separating carbonyl compounds by means of cation exchangers.

Samuelson and Gabrielson have described that aldehydes and ketones can be separated quantitatively from aqueous or alcoholic solutions in absorption columns by means of anion exchangers in the form of their bisulfites.

This known process is based on the fact that anion exchangers are capable of binding bisulfite ions, which, in turn, form bisulfite complexes with aldehydes and ketones, unless the latter are prevented from doing so by the influence of other factors.

The bisulfite complexes thus formed are retained on a sorption column. These bisulfite complexes, i.e., alpha-oxy-sulfonic acids, can be separated, due to their different stabilities, by appropriately selected elution agents. Thus, ketones can be eluated with hot water, while aldehydes can be recovered only by a subsequent treatment with concentrated neutral or alkaline solutions of electrolyte.

The known process is based on the use of anion exchangers. These are strong-base synthetic resins and, due to their chemical nature, much less stable than the corresponding acid synthetic resins or cation-exchangers. This fact is noticeable, for instance, in the behavior of these substances under high temperatures, at extreme pH values, against oxidizing agents on the one hand, and against reducing agents on the other.

It is an object of my invention to provide a method for the separation of carbonyl compounds which is based on the use of the stabler cation exchangers instead of the less stable anion exchangers.

It is another object of the invention to provide a method for making cation exchangers capable of sorptively binding carbonyl compounds.

It is a further object of this invention to provide a method for the separation of organic compounds containing a carbonyl group such as aldehydes and ketones from aqueous as well as nonaqueous water-miscible and water-immiscible solutions with aid of activated cation exchangers of the sulfonic acid type as well as of the carboxylic acid type.

These and other objects and advantages are obtained by the method according to my invention which is based on the discovery that cation exchangers are capable of reacting with the salts of certain nitrogen-containing compounds, in particular ammonia derivatives such as hydroxylamine, hydrazine, derivatives of these substances and the like, whereby the nature of the cation exchangers is so altered that they adopt, so to speak, the character of a base and become capable of reacting quantitatively with carbonyl compounds by means of the hydroxylamine, hydrazine or other ammonia derivative groups so as to form oximes, hydrazones and the like complexes.

Furthermore, I have discovered that the cation exchangers which are charged with hydrogen ions easily bind the aforesaid ammonia derivatives and retain them satisfactorily. I have also found that resin exchangers of the sulfonic acid type as well as of the carboxylic acid type are equally suitable for the method according to the invention. The ammonium ion is generally considered in the art to be most easily exchangeable. It was also to be expected that the aforesaid ammonia derivatives would be bound even less strongly to the exchanger than the ammonium ion itself. Therefore, when passing a solution containing calcium ions and carbonyl compounds through a weak-acid exchanger charged, for instance, with hydroxylammonium ions, it was to be expected that all hydroxylammonium ions would be exchanged against calcium ions because the weakly acid exchangers have, as is well known, a greater affinity to the alkali earth metal ions. Consequently, no carbonyl compounds should be retained on the column.

It was, however, found surprisingly that carbonyl compounds are retained quantitatively up to the break-through point and that only a relatively small amount of calcium ions are retained on the column.

The method, according to the invention, can be put into practice in the following manner:

The cation exchanger, which is first charged with hydrogen ions, is then charged with a diluted aqueous solution of a salt of the sorption agent which is selected to form the link between the cation exchanger and the carbonyl compounds to be separated.

As soon as the presence of this agent, i.e., the ammonia derivative in question, can be detected in the liquid emerging from the column, the treatment of the latter with the sorption agent is interrupted. The column is then briefly washed with water and thus ready for the working step.

The solution containing the aldehydes or ketones is then charged on to the column. As has been stated before, the break-through curves show a relatively steep characteristic. The carbonyl compounds are retained by the exchanger in the form of their oximes, hydrazones, and the like. In this form, they can best be eluted with mineral acids, hot water, with or without addition of salts, or with solvents which are miscible with water.

Sometimes it is possible by means of a suitable selection of the acid concentration and temperature conditions, to partially hydrolyze the oximes, or hydrazones, so that elution will yield the initial components, i. e., the carbonyl compounds and the hydroxylammonium salts, or hydrazine salts, separately.

It was furthermore found that the break-through capacity can be considerably increased if the exchange reaction is carried out in a non-aqueous solvent. Two modes of operation can be followed according to the invention.

The exchanger, prepared for carbonyl adsorption according to the invention, is either suspended in a solvent immiscible with water and an aqueous solution containing the carbonyl groups is then passed through the suspension in countercurrent flow; or a water-immiscible phase containing the carbonyl compounds is passed through the water-containing exchanger column.

For the method according to the invention is not limited to the separation of carbonyl compounds present in an aqueous phase, but can equally be applied to non-aqueous water-miscible phases such as spirits, as well as water-immiscible phases such as dichloroethane and the like.

While the separation of carbonyl compounds from aqueous phases is of importance in particular in the sulfite cellulose industry for the production of furfural and other volatile aldehydes from the condensates of the evaporating plant or expansion condenser as described in the following Examples III, IV, VII, VIII and IX, the method may also be applied to the separation of aldehyde from sulfite spirits as illustrated in the Example XII given hereinafter.

Although the theory of the process is not completely known, it can be assumed that a relationship exists between the aforementioned break-through capacity for the carbonyl compounds and the swelling capacity of the cation exchanger in the respective solvent.

The method, according to the invention, may further be applied successfully in the fractionation of solvent extracts from alkaline boiling or alkaline pressure oxidation of sulfite waste lyes, residual liquors, lignine sulfonates and the like, for the production of vanillin, acetovanillin, vanillic acid and the like. In this case, it is preferred to extract the neutralised reaction liquids with organic solvents, whereby the aldehydes, ketones and acids present are transferred to the organic solvent phase. In order to separate the aldehydes from this phase, the method, according to the invention, can be used advantageously in the modification set forth in detail in Example II.

If the pressure oxidation of the sulfite liquors has been carried out with calcium or barium hydroxide, the reaction liquors must be carefully neutralized with carbon dioxide and can then be processed immediately in accordance with the method of the invention, without previous extraction, by means of solvents in order to obtain vanillin by proceeding in a similar manner, as set forth in Examples I, II, V or VI.

*Example I*

An adsorption column consisting of a cation exchanger on the basis of a polystyrene sulfonic acid, of a column diameter of 30 millimetres and a height of 685 millimetres, is charged with hydrogen ions, washed and then charged with 1 liter of a normal hydroxylammoniumchloride solution until break-through occurs. The hydroxylamine is identified by its reducing action on Fehling solution. After a brief washing with 300 cc. of water, the column is charged with a 1% aqueous vanillin solution until vanillin can be detected in the liquid emerging from the column. Approximately 10 grams of vanillin are absorbed on the column.

*Example II*

The same column as described in Example I is charged with 1 liter of a normal hydroxylammoniumchloride solution and the equeous phase then displaced by dichloroethane. A 1% aqueous vanillin solution is then passed countercurrently to the preceding steps through the column. About 30 grams of vanillin are bound on the column until break-through occurs. Elution is then carried out with 3-normal hydrochloric acid. The main portion of the aldehyde is to be found in the fraction of from 250 to 600 cc. discharged from the column.

*Example III*

A column having the same dimensions as in the preceding examples and consisting of a cation exchanger on the basis of a polystyrene sulfonic acid which is charged with hydrogen ions, is further charged with 1500 cc. of a normal hydroxylammonium chloride solution and subsequently washed with 500 cc. of water. After passing a $\frac{1}{10}$-normal furfural solution through the column, this aldehyde is identified in the 1200 cc. of liquid discharged from the column. This corresponds to an absorption of approximately 12 grams of furfural at a rate of flow of 400 cc. per hour through the column. The aldehyde is then eluted with hydrochloric acid.

*Example IV*

The same column as described in Example III is treated with 1800 cc. of a normal hydroxylammoniumchloride solution. When passing a 1% formaldehyde solution through the column at a flow rate of 400 cc. per hour, about 41 grams of formaldehyde are absorbed until break-through occurs.

*Example V*

A column having a diameter of 0.8 and a height of 39.5 cm. and consisting of a cation exchanger on the basis of a porous polymeric sulfonic acid, is regenerated during 30 minutes with 100 cc. of a normal hydrochloric acid solution and then washed with 1200 cc. of water. The column is then charged for 2 hours with 250 cc. of a hydraziniumsulfate solution. The liquid discharged from the column reacts neutral.

After washing with 500 cc. of distilled water, the column prepared in the aforesaid manner absorbs 4 grams of vanillin up to the breaking-through point from a 1% aqueous solution of the aldehyde. The elution is preferably carried out with alcoholic hydrochloric acid in countercurrent as, otherwise, precipitating vaillin hydrazone (precipitating point observed at about 180° C.) will easily clog the column.

*Example VI*

A column having a diameter of 0.8 and a height of 34.0 cm. and consisting of a cation exchanger on the basis of a porous polymeric sulfonic acid, is charged with 250 cc. of phenylhydraziniumchloride (7.2 grams). About 2.5 g. of vanillin are then absorbed from a 1% aqueous solution thereof up to the break-through point.

*Example VII*

Under the same conditions as stated in Example VI, a column pretreated with 1000 cc. of a normal hydroxylammoniumchloride solution and consisting of a cation exchanger on the basis of a polymeric carboxylic acid, absorbs about 16.5 g. of formaldehyde.

*Example VIII*

By repeating the steps of Example VI on a column having a diameter of 3.0 cm. and a height of 58.0 cm. and consisting of a cation exchanger of a polymeric phenolsulfonic acid type, it is possible to absorb 22 g. of formaldehyde under otherwise substantially the same conditions.

*Example IX*

If the same column as described in Example VIII, containing the same exchanger is pretreated with 700 cc. of a normal hydroxylammoniumchloride solution, the capacity of the column to absorb furfural from a $\frac{1}{10}\%$ aqueous solution, is found to be about 13.5 g. of the aldehyde.

*Example X*

If the same column as described and used in the preceding example is regenerated with hydrochloric acid, washed and recharged with 850 cc. of a normal hydroxylammoniumchloride solution, about 11.0 g. of vanillin can be absorbed.

*Example XI*

A column having a diameter of 3.0 cm. and a height of 56.0 cm. and consisting of a cation exchanger on the basis of a polymeric carboxylic acid, which is treated in the same way as described in Examples XIII, IX and X, can also absorb 11 g. of vanillin.

*Example XII*

In order to purify a sulfite crude spirit, an exchanger material is particularly suitable which is based on a polystyrene sulfonic acid or a polymeric phenolsulfonic acid. Columns of these exchangers were regenerated with 700 cc. of normal hydrochloric acid and subsequently washed with 1800 cc. of water until the liquid discharged from the columns was free from acid.

After charging with 600 cc. of hydroxylammoniumchloride solution at a flow rate of 3 to 5 cc. per minute and subsequent washing with about 250 cc. of water at the same flow rate, the column was charged with industrial 96% sulfite spirits having an average aldehyde content of 215 milligrams per liter. At this instant the column dimensions were 2.7 cm. in diameter and 49.0 cm. in height for the first and 2.7 cm. in diameter and 58.0 cm. in height for the second type of exchanger. These heights were reduced by the addition of alcohol, by about 6 cm. to about 4 cm. At a flow rate of about 3 to 4 milliliters per minute, about 15 liters of sulfite spirits on the first and about 38 liters on the second column could be completely freed from aldehyde. The aldehyde determination was carried out by a standard method.

The exchange capacity and the elutability of the exchangers prepared according to the invention depend, of course, on the type and the characteristics of the exchanger selected in each case. However, the breakthrough curves show a steep characteristic in the vast majority of cases and thus indicate that sorption is taking place very rapidly.

The method, according to the invention, can be applied with advantage to the elimination of disturbing, even minor, quantities of carbonyl compounds in the column process as well as in an equilibrium reaction, even from solutions having a relatively high content of electrolytes.

The new method is further distinguished from the known method of sorption on anion exchangers charged with bisulfite ions by the greater physico-chemical stability of the sorption agent and by use of less expensive exchanger materials.

It will be understood that this invention is susceptible to modification in order to adapt it to different usages and conditions and, accordingly, it is desired to comprehend such modifications within this invention as may fall within the scope of the appended claims.

What I claim is:

1. A method for separating aldehydic carbonyl compounds from solutions containing the same by means of ion exchangers comprising the steps of charging a cation exchanger selected from the group consisting of porous polymeric sulfonic acid, polystyrene sulfonic acid, polymeric phenol sulfonic acid, and polymeric carboxylic acid type cation exchanger, with hydrogen ions and then with a partially dehydrogenated ammonia derivative selected from the group consisting of hydroxyl amine, hydrazine, mineral acid salts thereof, and phenyl hydrazinium chloride, thereby making said cation exchanger sorptive for aldehydes and charging the resulting carbonyl-sorptive exchanger with a solution containing carbonyl compounds, and acidically eluting the resulting absorbed aldehydic carbonyl compounds from the cation exchanger.

2. A method according to claim 1, characterized in that the solution containing the carbonyl compounds is an aqueous solution.

3. A method according to claim 1, characterized in that the solution containing the carbonyl compounds is a non-aqueous, water-miscible solution.

4. A method according to claim 1, characterized in that the solution containing the carbonyl compounds is a water-immiscible solution.

5. A method for separating aldehydic carbonyl compounds from an aqueous solution containing the same by means of ion exchangers, comprising the steps of making a cation exchanger sorptive for aldehydes and ketones by charging a column consisting of said cation exchanger with hydrogen ions and then with an aqueous solution of a partially dehydrogenated ammonia derivative selected from the group consisting of hydroxyl amine, hydrazine, mineral acid salts thereof, and phenyl hydrazinium chloride, displacing the aqueous phase in the column by a water-immiscible solvent, then passing said aqueous solution containing said carbonyl compounds through the resulting suspension of the carbonyl-sorptive exchanger in the water-immiscible solvent, and acidically eluting the resulting absorbed aldehydic carbonyl compounds from the cation exchanger.

6. A method according to claim 5, characterized in that the water-immiscible solvent is dichloroethane.

7. A method according to claim 5, characterized in that the cation exchanger is of a porous polymeric sulfonic acid type.

8. A method according to claim 5, characterized in that the ammonia derivative is hydroxylammonium chloride.

9. A method according to claim 8, characterized in that the hydroxylammoniumchloride is used in an aqueous solution containing 1 gram-equivalent of said chloride per liter.

10. A claim according to claim 5 characterized in that the ammonia derivative is hydrazinium sulfate.

11. A claim according to claim 5, characterized in that the ammonia derivative is phenylhydraziniumchloride.

12. In a method for separating aldehydic carbonyl compounds from solutions containing the same by means of adsorption of the compounds on an ion exchanger and subsequent elution of the adsorbate from the ion exchanger, the steps of charging a cation exchanger selected from the group consisting of porous polymeric sulfonic acids, polystyrene sulfonic acid, polymeric phenol sulfonic acid, and polymeric carboxylic acid type cation exchanger, with hydrogen ions and with a partially dehydrogenated ammonia derivative selected from the group consisting of hydroxyl amine, hydrazine, mineral acid salts thereof, and phenyl hydrazinium chloride, thereby making the cation exchanger sorptive for aldehydes, and charging the resulting aldehyde sorptive exchanger with a solution containing the aldehydic carbonyl compounds so as to adsorb the latter on said exchanger by means of the formation of a complex compound between said aldehydic compound and said ammonia derivative.

13. A method for separating vanillin from solutions containing the same by means of ion exchangers comprising the steps of making a cation exchanger selected from the group consisting of porous polymeric sulfonic acid, polystyrene sulfonic acid, polymeric phenol sulfonic acid, and polymeric carboxylic acid type cation exchanger, sorptive for aldehydes by charging the exchanger with hydrogen ions and with a partially dehydrogenated ammonia derivative capable of forming complexes with aldehyde compounds and selected from the group consisting of hydroxyl amine, hydrazine, mineral acid salts thereof, and phenyl hydrazinium chloride, charging the resulting aldehyde sorptive exchanger with a solution containing vanillin to be recovered, and separating the resultant absorbed vanillin from the sorptive exchanger by washing the same with hydrochloric acid solution.

References Cited in the file of this patent

UNITED STATES PATENTS 2,449,364   Blankart    Sept. 14, 1948
2,709,710   Crummett et al.    May 31, 1955

OTHER REFERENCES

Samuelson et al.: Chem. Abstr. 46:9018i.
Samuelson: Ion Exchangers in Analytical Chemistry, pp. 190–195 (1953).